(12) United States Patent
van der Schaar et al.

(10) Patent No.: US 9,021,119 B2
(45) Date of Patent: Apr. 28, 2015

(54) SYSTEMS AND METHODS FOR PERFORMING ADAPTIVE BITRATE STREAMING BASED UPON THE DELAY OF EACH STREAM AND THE CHANNEL RATE

(75) Inventors: Auke Sjoerd van der Schaar, Los Angeles, CA (US); Som Vaezzadeh Naderi, Del Mar, CA (US)

(73) Assignee: Sonic IP, Inc., San Diego, CA (US)

( * ) Notice: Subject to any disclaimer, the term of this patent is extended or adjusted under 35 U.S.C. 154(b) by 349 days.

(21) Appl. No.: 13/341,667

(22) Filed: Dec. 30, 2011

(65) Prior Publication Data

US 2012/0179834 A1    Jul. 12, 2012

Related U.S. Application Data

(60) Provisional application No. 61/430,502, filed on Jan. 6, 2011.

(51) Int. Cl.
  *G06F 15/16* (2006.01)
  *H04N 19/187* (2014.01)
  *H04N 19/30* (2014.01)
  (Continued)

(52) U.S. Cl.
  CPC ............. *H04N 19/187* (2014.11); *H04N 19/30* (2014.11); *H04N 19/115* (2014.11); *H04N 19/156* (2014.11)

(58) Field of Classification Search
  CPC .................... H04N 21/23439; H04N 21/2358; H04N 21/2662; H04N 21/4325; H04N 21/44004; H04N 21/6373; H04N 19/0006; H04N 19/00206; H04N 19/00218; H04N 19/00236; H04N 19/00266; H04N 19/00321; H04N 19/00424; H04N 19/00751; H04N 19/00781

USPC ................ 709/231, 233; 375/240.21, E7.013
See application file for complete search history.

(56) References Cited

U.S. PATENT DOCUMENTS 5,907,688 A * 5/1999 Hauck et al. ................... 710/107
7,949,775 B2 * 5/2011 Virdi et al. ..................... 709/231
(Continued)

FOREIGN PATENT DOCUMENTS

WO    2012094258 A1   7/2012

OTHER PUBLICATIONS

International Search Report and Written Opinion for International Application PCT/US2011/68284, Report Completed Mar. 30, 2012, 9 pgs.

(Continued)

*Primary Examiner* — Kyung H Shin
(74) *Attorney, Agent, or Firm* — KPPB LLP

(57) ABSTRACT

Systems and methods for adaptive bitrate streaming in which playback devices select streams based upon stream delay and channel rate in accordance with embodiments of the invention are disclosed. One embodiment is configured to select a first video stream from a set of alternative streams, where at least a plurality of the alternative streams are encoded to have an upper bound seek delay that is equal to or less than the upper bound seek delay of streams in the set of alternative streams that are encoded at a higher maximum bitrate, request chunks of the first video stream and store the requested chunks in the buffer, playback the buffered chunks, measure the channel data rate, and select a second video stream from the set of alternative streams, where the second video stream has a maximum bitrate that is less than the measured channel data rate.

32 Claims, 7 Drawing Sheets

(51) Int. Cl.
*H04N 19/115* (2014.01)
*H04N 19/156* (2014.01)

(56) References Cited

U.S. PATENT DOCUMENTS

2006/0165166 A1 7/2006 Chou et al.
2008/0225953 A1* 9/2008 Ratakonda et al. ...... 375/240.21
2008/0271102 A1 10/2008 Kienzle et al.
2009/0300203 A1* 12/2009 Virdi et al. .................... 709/231
2010/0129056 A1 5/2010 Connery et al.
2011/0158612 A1 6/2011 Takeda
2012/0177101 A1 7/2012 van der Schaar

OTHER PUBLICATIONS

Anonymous, Series H: Audiovisual and Multimedia Systems, Infrastructure of audiovisual services—Coding of moving video, Mar. 2005, International Telecommunication Union, 49 pgs.

* cited by examiner

SYSTEMS AND METHODS FOR PERFORMING ADAPTIVE BITRATE STREAMING BASED UPON THE DELAY OF EACH STREAM AND THE CHANNEL RATE

CROSS REFERENCE TO RELATED APPLICATIONS

This application claims priority to U.S. Provisional. Application Ser. No. 61/430,502, filed Jan. 6, 2011, the entirety of which is incorporated herein by reference.

FIELD OF THE INVENTION

The present invention generally relates to adaptive bitrate streaming and more specifically to the buffering of media by playback devices in adaptive bitrate streaming systems.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth) in real time and adjusting the quality of the streamed media accordingly. Typically, the source media is encoded at multiple bit rates and the playback device or client switches between streaming the different encodings depending on available resources.

A common goal with adaptive bitrate streaming is to stream the highest bitrate stream available given the streaming conditions experienced by the playback device without stalls in the playback of media due to underflow. Underflow occurs when the playback device receives streaming media at a lower speed than the speed at which the media is played back. The video used in most adaptive bitrate streaming systems is encoded using variable bit rate encoding, which is typically more efficient. Even though the bitrate of the stream varies in time, the stream is typically described based upon its average bit rate. When variable bitrate encoding is used, the maximum bitrate of the stream is the rate that ensures no underflow will occur given a certain buffer size. Most playback devices accommodate variation in the size of the encoded frames using a buffer. In the context of video, the buffering delay (which can also be referred to as the seek delay) is the time a playback device must wait between starting filling the buffer and commencing playback to prevent underflow (i.e. a certain amount of data is buffered before decoding can start).

SUMMARY OF THE INVENTION

Systems and methods in accordance with embodiments of the invention perform adaptive bitrate streaming in which playback devices select streams based upon the delay of each stream and the channel rate in accordance with embodiments of the invention are illustrated. One embodiment of the invention includes memory including a client application and a buffer, and a processor, where the client application configures the processor to: select a first video stream from a set of alternative video streams, where at least a plurality of the alternative video streams are encoded to have an upper bound seek delay that is equal to or less than the upper bound seek delay of streams in the set of alternative video streams that are encoded at a higher maximum bitrate; request chunks of the first video stream via a network connection and store the requested chunks in the buffer; playback the buffered chunks of the first video stream; measure the channel data rate of the network connection; and select a second video stream from the set of alternative streams, where the second video stream has a maximum bitrate that is less than the measured channel data rate.

In a further embodiment, the client application configures the processor to measure the channel data rate of the network connection by configuring the processor to: calculate the amount of data downloaded during a predetermined time interval; observe any gaps during which now data is downloaded during the predetermined time interval; calculate an effective time interval by subtracting the duration of any gaps from the predetermined time interval; and divide the amount of data downloaded by the effective time interval to obtain a data rate measurement.

In another embodiment, the client application further configures the processor to obtain a measured channel data rate by subtracting a predetermined safety margin from the data rate measurement.

In a still further embodiment, the client application configures the processor to select a second video stream having the highest maximum bitrate that is less than the measured channel data rate when the buffer contains chunks from the first video stream having a playback duration greater than or equal to the upper bound seek delay of the first video stream.

In still another embodiment, the client application configures the processor to select a second video stream having the highest maximum bitrate that is less than the measured channel data rate when the buffer contains chunks from the first video stream having a playback duration greater than or equal to the upper bound seek delay of the second video stream.

In a yet further embodiment, each of the alternative streams of video is encoded subject to a maximum buffer size constraint and a maximum bitrate, and the client application configures the processor to determine the upper bound seek delay of a stream of video based upon the maximum buffer size constraint and a maximum bitrate used in the encoding of the video stream.

In yet another embodiment, the client application configures the processor to determine the upper bound seek delay of a stream of video as:

$$\text{Delay} = \frac{\text{level buffersize} + \text{level rate} \cdot \text{duration chunk}}{\text{rate}}$$

where level buffersize is the maximum buffer size constraint used in encoding the video stream;
duration chunk is the time taken to playback a single chunk of video;
level rate is the maximum bitrate of the video; and
rate is the network data rate.

In a further embodiment again, the client application configures the processor to select a second video stream from the set of alternative streams so that the playback duration of the amount of media downloaded from the second video stream during the time taken to playback buffered chunks of content from the first video stream is greater than or equal to the lower bound seek delay of the second video stream.

In another embodiment again, the lower bound seek delay of each of the alternative video streams is included in each of the alternative video streams, and the client application further configures the processor to obtain the lower bound seek delay of the second video stream from the first video stream.

In a further additional embodiment, the alternative streams of video are H.264 bitstreams that carry delay information in a SEI buffering message in a initial_cpb_removal_delay field, and the client application configures the processor to select a second video stream from the set of alternative streams so that the playback duration of the amount of media downloaded from the second video stream during the time taken to playback buffered chunks of content from the first video stream is greater than or equal to a delay calculated using the value specified in the of the SEI buffering message in an initial_cpb_removal_delay field in the second stream.

In another additional embodiment, a safe seek delay is included in each of the alternative video streams, and the client application configures the processor to select a second video stream from the set of alternative streams so that the playback duration of the amount of media downloaded from the second video stream during the time taken to playback buffered chunks of content from the first video stream is greater than or equal to the safe seek delay.

In a still yet further embodiment, the alternative streams of video are H.264 bitstreams that carry the safe seek delay in a SEI buffering message in a initial_cpb_removal_delay field.

In still yet another embodiment, the client application configures the processor to: select the first video stream from the set of alternative streams so that the first video stream has a maximum bitrate that is a predetermined amount below the measured channel data rate; and buffer chunks received from the first video stream during playback of the first video stream so that the playback duration of the buffered chunks is greater than or equal to the upper bound seek delay for the first video stream.

In a still further embodiment again, the client application configures the processor to select a second video stream having the highest maximum bitrate that is less than the measured channel data rate when the buffer contains chunks from the first video stream having a playback duration greater than or equal to the upper bound seek delay of the first video stream.

In still another embodiment again, the client application configures the processor to select a second video stream having the lowest maximum bitrate when the buffer contains chunks from the first video stream having a playback duration less than the upper bound seek delay of the first video stream and the measured channel data rate is unreliable.

In a still further additional embodiment, the client application configures the processor to select a second video stream having a maximum bitrate that is greater than the maximum bitrate of the first video stream when the expected time to download a chunk of the first video stream based upon the measured channel data rate is a predetermined amount greater than the actual time taken to download the chunk of the first video stream and the buffer contains chunks from the first video stream having a playback duration greater than or equal to the upper bound seek delay of the first video stream.

An embodiment of the method of the invention includes selecting a first video stream from a set of alternative video streams using a playback device, where at least a plurality of the alternative video streams are encoded to have an upper bound seek delay that is equal to or less than the upper bound seek delay of streams in the set of alternative video streams that are encoded at a higher maximum bitrate, requesting chunks of the first video stream via a network connection using the playback device and storing the requested chunks in a buffer, playing back the buffered chunks of the first video stream using the playback device, measuring the channel data rate of the network connection using the playback device, and selecting a second video stream from the set of alternative streams using the playback device, where the second video stream has a maximum bitrate that is less than the measured channel data rate.

In a further embodiment of the method of the invention, measuring the channel data rate of the network connection using the playback device further includes calculating the amount of data downloaded during a predetermined time interval using the playback device, observing any gaps during which now data is downloaded during the predetermined time interval using the playback device, calculating an effective time interval by subtracting the duration of any gaps from the predetermined time interval using the playback device, and dividing the amount of data downloaded by the effective time interval to obtain a data rate measurement using the playback device.

In another embodiment of the method of the invention, measuring the channel data rate of the network connection using the playback device further includes obtaining a measured channel data rate by subtracting a predetermined safety margin from the data rate measurement.

In a still further embodiment of the method of the invention, selecting a second video stream from the set of alternative streams using the playback device further includes selecting a second video stream using the playback device, where the second stream has the highest maximum bitrate that is less than the measured channel data rate when the buffer contains chunks from the first video stream having a playback duration greater than or equal to the upper bound seek delay of the first video stream.

In still another embodiment of the method of the invention, selecting a second video stream from the set of alternative streams using the playback device further includes selecting a second video stream using the playback device, where the second stream has the highest maximum bitrate that is less than the measured channel data rate when the buffer contains chunks from the first video stream having a playback duration greater than or equal to the upper bound seek delay of the second video stream.

In a yet further embodiment of the method of the invention, each of the alternative streams of video is encoded subject to a maximum buffer size constraint and the method further includes determining the upper bound seek delay of a stream of video using the playback device based upon the maximum buffer size constraint used in the encoding of the video stream.

In yet another embodiment of the method of the invention, also includes determining the upper bound seek delay of a stream of video as:

$$\text{Delay} = \frac{\text{level buffersize} + \text{level rate} \cdot \text{duration chunk}}{\text{rate}}$$

where level buffersize is the maximum buffer size constraint used in encoding the video stream;
  duration chunk is the time taken to playback a single chunk of video;
  level rate is the maximum bitrate of the video; and
  rate is the network data rate.

In a further embodiment again of the method of the invention, selecting a second video stream from the set of alternative streams using the playback device further includes selecting a second video stream from the set of alternative streams using the playback device so that the playback duration of the amount of media downloaded from the second video stream during the time taken to playback buffered chunks of content from the first video stream is greater than or equal to the lower bound seek delay of the second video stream.

In another embodiment again of the method of the invention, the lower bound seek delay of each of the alternative video streams is included in each of the alternative video streams and the method further includes obtaining the lower bound seek delay of the second video stream from the first video stream using the playback device.

In a further additional embodiment of the method of the invention, the alternative streams of video are H.264 bitstreams that carry delay information in a SEI buffering message in a initial_cpb_removal_delay field, and selecting a second video stream from the set of alternative streams using the playback device further includes selecting a second video stream from the set of alternative streams using the playback device so that the playback duration of the amount of media downloaded from the second video stream during the time taken to playback buffered chunks of content from the first video stream is greater than or equal to a delay calculated using the value specified in the of the SEI buffering message in an initial_cpb_removal_delay field in the second stream.

In another additional embodiment of the method of the invention, a safe seek delay is included in each of the alternative video streams, and selecting a second video stream from the set of alternative streams using the playback device further includes selecting a second video stream from the set of alternative streams so that the playback duration of the amount of media downloaded from the second video stream during the time taken to playback buffered chunks of content from the first video stream is greater than or equal to the safe seek delay.

In a still yet further embodiment of the method of the invention, the alternative streams of video are H.264 bitstreams that carry the safe seek delay in a SEI buffering message in a initial_cpb_removal_delay field.

In still yet another embodiment of the method of the invention, selecting a first video stream from the set of alternative streams further includes selecting the first video stream from the set of alternative streams using the playback device so that first video stream has a maximum bitrate that is a predetermined amount below the measured channel data rate, and buffering chunks of the first video stream during playback of the first video stream so that the playback duration of the amount of the buffered chunks from the first video stream is greater than or equal to the upper bound seek delay for the first video stream.

In a still further embodiment again of the method of the invention, selecting a second video stream from the set of alternative streams using the playback device further includes selecting a second video stream using the playback device, where the second video stream has the highest maximum bitrate that is less than the measured channel data rate when the buffer contains chunks from the first video stream having a playback duration greater than or equal to the upper bound seek delay of the first video stream.

In still another embodiment again of the method of the invention, selecting a second video stream from the set of alternative streams using the playback device further includes selecting a second video stream using the playback device, where the second video stream has the lowest maximum bitrate when the buffer contains chunks from the first video stream having a playback duration less than the upper bound seek delay of the first video stream and the measured channel data rate is unreliable.

In a still further additional embodiment of the method of the invention, selecting a second video stream from the set of alternative streams using the playback device further includes selecting a second video stream using the playback device, where the second video stream has a maximum bitrate that is greater than the maximum bitrate of the first video stream when the expected time to download a chunk of the first video stream based upon the measured channel data rate is a predetermined amount greater than the actual time taken to download the chunk of the first video stream and the buffer contains chunks from the first video stream having a playback duration greater than or equal to the upper bound seek delay of the first video stream.

DETAILED DESCRIPTION OF DRAWINGS

Figure 1A:
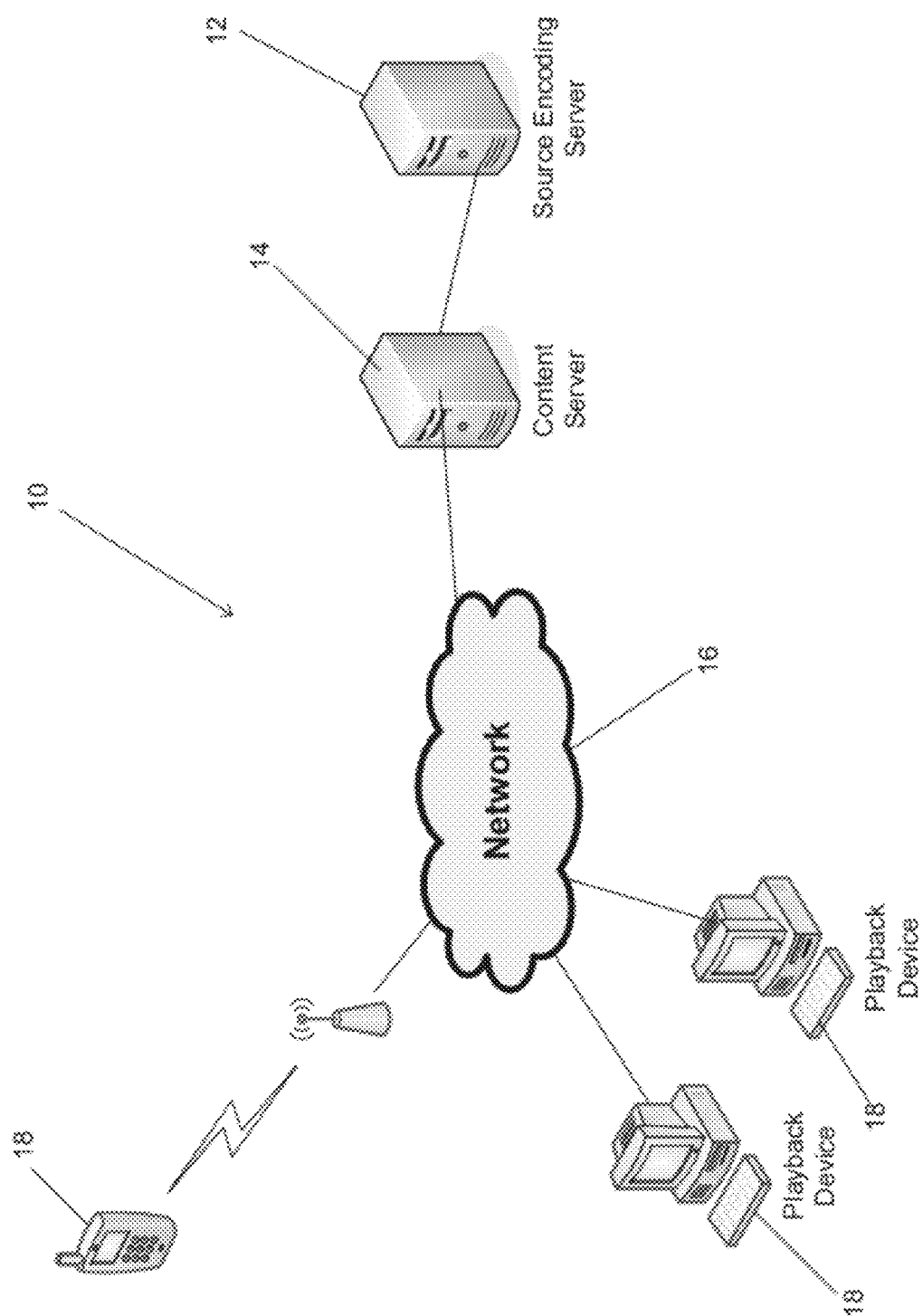
FIG. 1A is an architecture diagram of an adaptive bitrate streaming system in accordance with an embodiment of the invention.

Turning now to the drawings, systems and methods for adaptive bitrate streaming in which playback devices select streams based upon the delay of each stream and the channel rate in accordance with embodiments of the invention are illustrated. The delay of a stream is the amount of time media is buffered prior to commencing playback so that underflow does not occur during playback. In several embodiments, an upper bound seek delay can be determined based upon the maximum bitrate and maximum buffer size with which a stream is encoded. In many embodiments, every stream is encoded to have an upper bound seek delay that is equal to or less than the upper bound seek delay of higher bitrate streams. In several embodiments, the upper bound seek delay of a stream is limited based upon a predetermined maximum buffer size that is determined based upon the size of the available buffer on common playback devices. When the streams are encoded according to these constraints, a playback device buffering an amount of media prior to playback having a duration equal to the upper bound seek delay (plus a safety margin) has sufficient time to respond to a reduction in channel data rate so that the playback device can automatically switch to the optimal stream for the new channel conditions.

In a number of embodiments, a lower bound seek delay is determined by analyzing a specific stream and determining a minimum amount of seek delay to prevent underflow. Utilizing the lower bound seek delay can significantly reduce delays when commencing playback of streaming media. However, buffering less media can mean that the playback device has less time to switch to a lower bitrate stream in response to a sudden drop in channel rate. In several embodiments, the playback device responds to a sudden drop in channel rate by selecting the highest bitrate stream for which the lower bound seek delay can be buffered within the playback duration of the currently buffered media at the new channel rate. In many embodiments, safety margins are also utilized in the calculations to accommodate variations that occur in real world systems.

The lower bound seek delay can vary depending upon the point within the stream at which playback commences. In addition, the lower bound seek delay can vary depending upon the rate of each stream. In a number of embodiments, the playback device obtains the lower bound seek delays for all of the streams from the server. In several embodiments, the playback device only obtains the largest of the lower bound seek delays for each stream from the server. When video is encoded in accordance with the H.264 standard developed by the Telecommunication Standardization Sector's Video Coding Experts Group together with the International Organization for Standardization (ISO), International. Electro technical. Commission (IEC) and Moving Picture Experts Group (MPEG), playback devices in accordance with many embodiments of the invention consider the value of the initial_cpb_removal_delay field in an SEI buffering message within the H.264 stream to be equivalent to the lower bound seek delay. In a number of embodiments, the value in the initial_cpb_removal_delay field in each stream is modified by the adaptive bitrate streaming system to be the maximum lower bound seek delay and/or initial_cpb_removal_delay value for all of the alternative streams hosted by the server. In other embodiments, the playback device adjusts the initial_cpb_removal_delay to estimate the delay of the next downloaded chunk of the stream. In several embodiments, the adjustment includes (but is not limited to) a scaling factor, a correction factor, and/or a safety margin.

In several embodiments, the lower bound seek delay is used by the playback device to determine the amount of media to buffer prior to commencing playback. However, the playback device selects a stream having a maximum bitrate that is significantly below the channel rate so that the buffer quickly reaches the upper bound seek delay for the stream. When the amount of media in the buffer has a playback duration equal to the upper bound seek delay, the playback device can then freely switch to the optimal stream for the channel conditions from that point onward. Adaptive bitrate streaming systems, playback devices, and the buffering and playback of adaptive bitrate streaming media in accordance with embodiments of the invention are discussed further below.

Adaptive Streaming System Architecture

An adaptive bitrate streaming system in accordance with an embodiment of the invention is illustrated in FIG. 1A. The adaptive bitrate streaming system 10 includes a source encoding server 12 configured to encode source media as a number of alternative streams. As is discussed further below, the source encoding server 12 generates a top level index to a plurality of container files containing the encoded streams, at least a plurality of which are alternative streams of encoded video. These files are uploaded to a content server 14. A variety of playback devices 18 can then request portions of the encoded streams from the content server 14 via a network 16 such as the Internet.

In many embodiments, the top level index file is a SMIL file and the media is stored in Matroska container files and playback devices request portions of the files using HTTP or another similar stateless protocol. However, any appropriate index file format and/or container file format can be utilized to store and index encoded streams and any suitable communication protocol can be utilized by playback devices 18 to obtain data from the content server 14 in accordance with embodiments of the invention.

Although a specific architecture is shown in FIG. 1A any of a variety of architectures can be utilized to perform adaptive bitrate streaming in accordance with embodiments of the invention. Source encoders and playback devices in accordance with embodiments of the invention are discussed further below.

Source Encoders

Figure 1B:
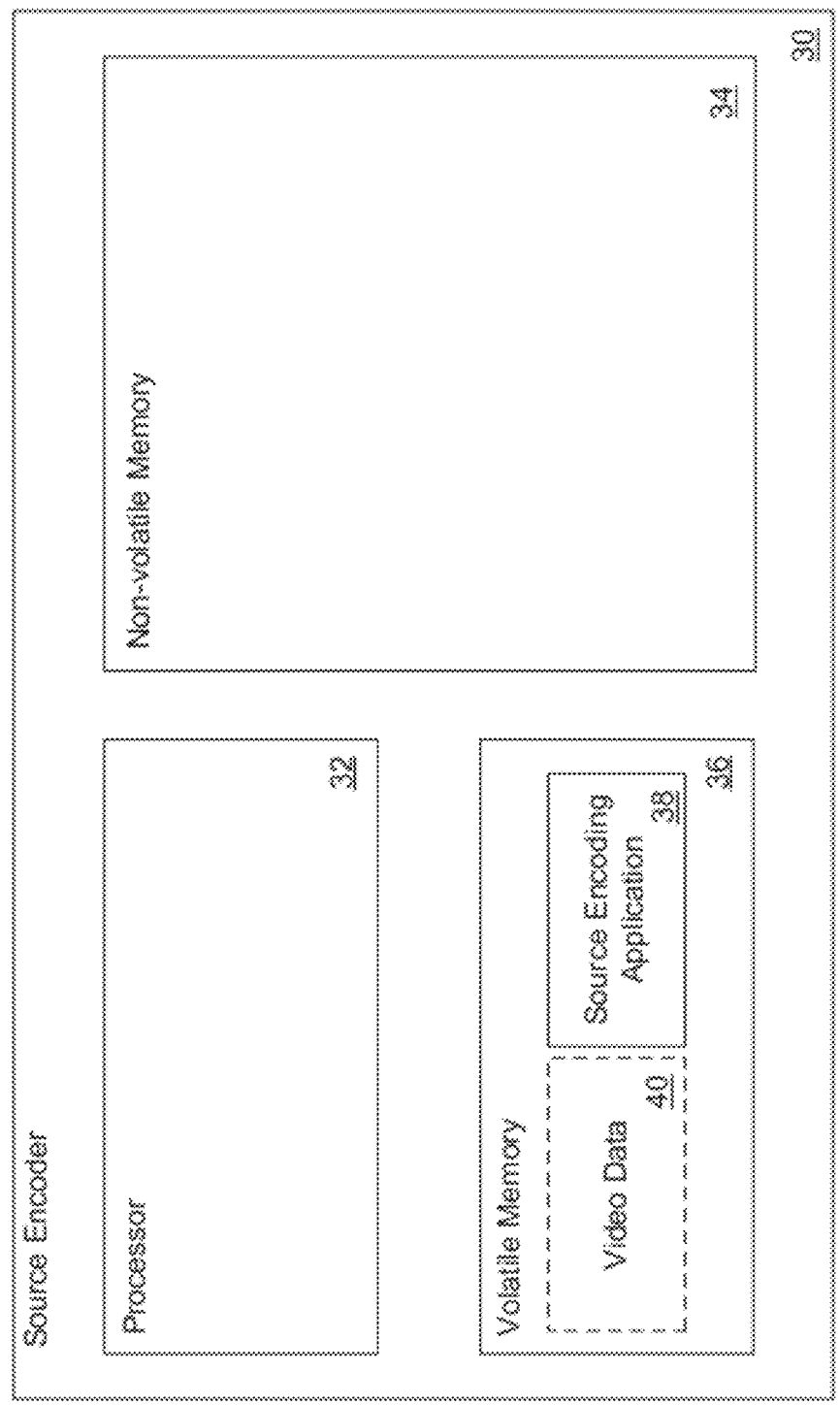
FIG. 1B is an architecture diagram of a source encoder in accordance with an embodiment of the invention.

In the illustrated embodiment, the adaptive bitrate streaming system includes one or more source encoders capable of encoding a source stream of video content into alternative streams of encoded video having different maximum bitrates and where the upper bound seek delays of each of the streams is equal to or less than the upper bound seek delays of any of the other alternative streams encoded at a higher bitrate. In many embodiments, the source encoder can be implemented using any device capable of encoding streams of multimedia, where the streams are encoded at different resolutions, sampling rates, upper bound seek delays and/or maximum bitrates. The basic architecture of an adaptive streaming system source encoder in accordance with an embodiment of the invention is illustrated in FIG. 1B. The adaptive bitrate streaming system 30 includes a processor 32 in communication with non-volatile memory 34 and volatile memory 36. In the illustrated embodiment, the volatile memory includes a source encoding application 38 and alternative streams of video data 40. The source encoding application 38 takes media including a source video stream as an input and encodes the source video as a plurality of alternative streams. In many embodiments, the alternative streams are encoded with different resolutions, sample aspect ratios, and/or maximum bitrates. Due to the differences in the maximum bitrates at which the alternative streams are encoded, a playback device can switch between the alternative streams to perform adaptive bitrate streaming of the encoded source video. As is discussed further below, a playback device can seamlessly down switch between streams when each of the alternative streams is encoded so that its upper bound seek delay is less than the playback duration of the amount of media in the buffer. When the amount of buffered media has a playback duration equal to the upper bound seek delay of any of the other alternative streams encoded at a lower maximum bitrate, then the playback device will seamlessly down switch. As is also discussed below, the lower bound seek delay can also be useful to playback devices in enabling more rapid commencement of playback. In several embodiments, information concerning the upper bound seek delay of a stream and/or the lower bound seek delay of stream can be made available to playback devices by the source encoding application 38 by including the information in a container file containing the stream or by including the information in a top level index file that describes the stream.

In embodiments where the alternative streams of video data are encoded in accordance with the H.264 standard, the source encoding application 38 can write a value indicative of the lower bound seek delay into an initial_cpb_removal_ delay field in an SEI buffering message within each alternative H.264 stream. In many embodiments, the source encoding application 38 writes the lower bound seek delay and/or the initial_cpb_removal_delay value of the alternative stream having the highest lower bound seek delay to the initial_cpb_removal_delay field in each of the alternative streams. As is discussed below, the maximum lower bound seek delay is typically sufficient for performing stream switching in accordance with many embodiments of the invention. In other embodiments, any of a variety of mechanism for including lower bound seek delay information in video streams including streams that are encoded in formats other than in accordance with the H.264 standard can be utilized.

Figure 3:
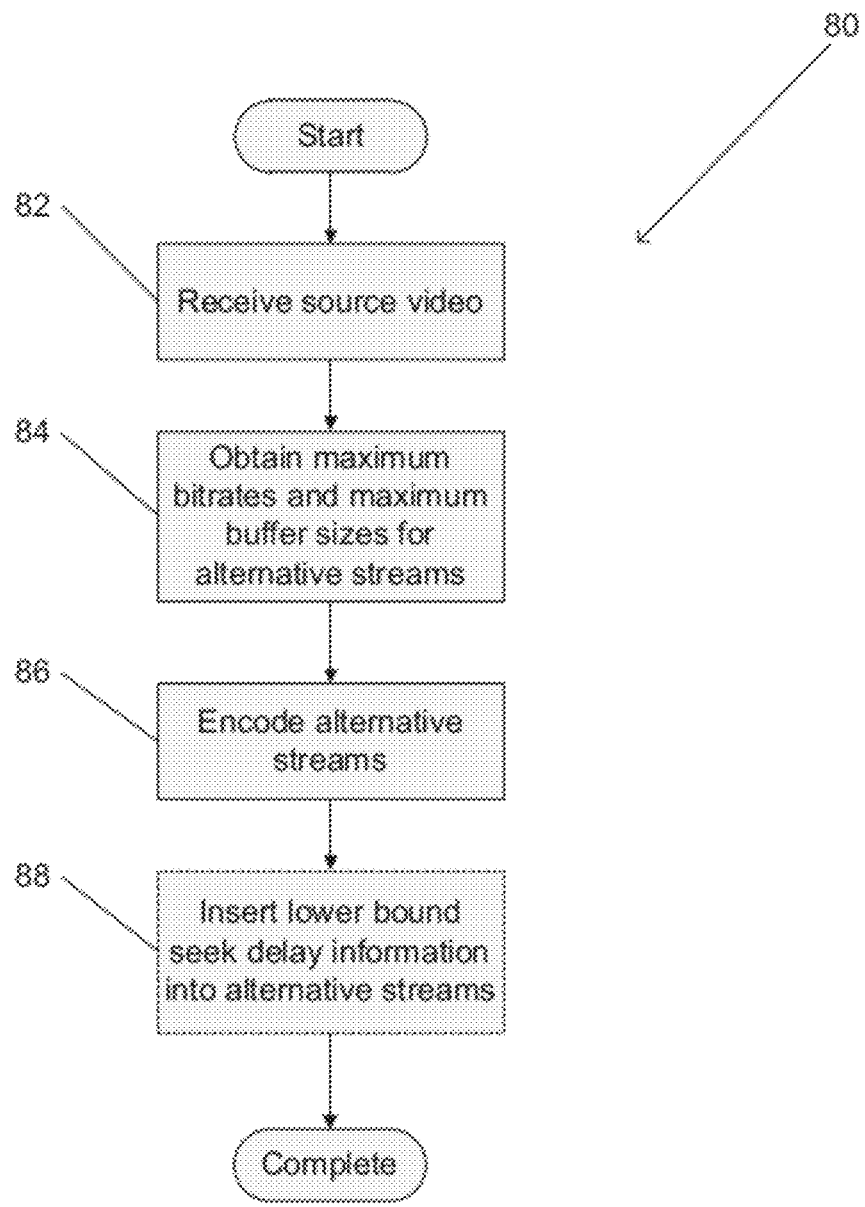
FIG. 3 is a flow chart illustrating a process for encoding alternative streams of video in accordance with an embodiment of the invention.

A process for encoding source video as a plurality of alternative streams in accordance with embodiments of the invention is illustrated in FIG. 3. The process 80 includes receiving (82) source video and obtaining (84) maximum bitrates and maximum buffer sizes for each of the alternative video streams that will be generated by the source encoder. The alternative video streams are then encoded (86) and are typically written to container files. In writing the encoded video streams to container files, the process 80 can also write (88) information concerning lower bound seek delays into each of the alternative streams in a manner similar to that outlined above. In many embodiments, information indicative of the lower bound seek delay of each stream is included with the stream. In several embodiments, the highest lower bound seek delay of all of the streams is included in each of the files.

Although a specific architecture is illustrated in FIG. 1B, any of a variety of architectures including architectures where the application is located on disk or some other form of storage and is loaded into volatile memory at runtime can be utilized to implement source encoders capable of encoding a stream of source video content into alternative streams of encoded video having different maximum bitrates and where the upper bound seek delays of each of the streams is equal to or less than the upper bound seek delays of any of the other alternative streams encoded at a higher bitrate in accordance with embodiments of the invention.

Playback Devices

Figure 1C:
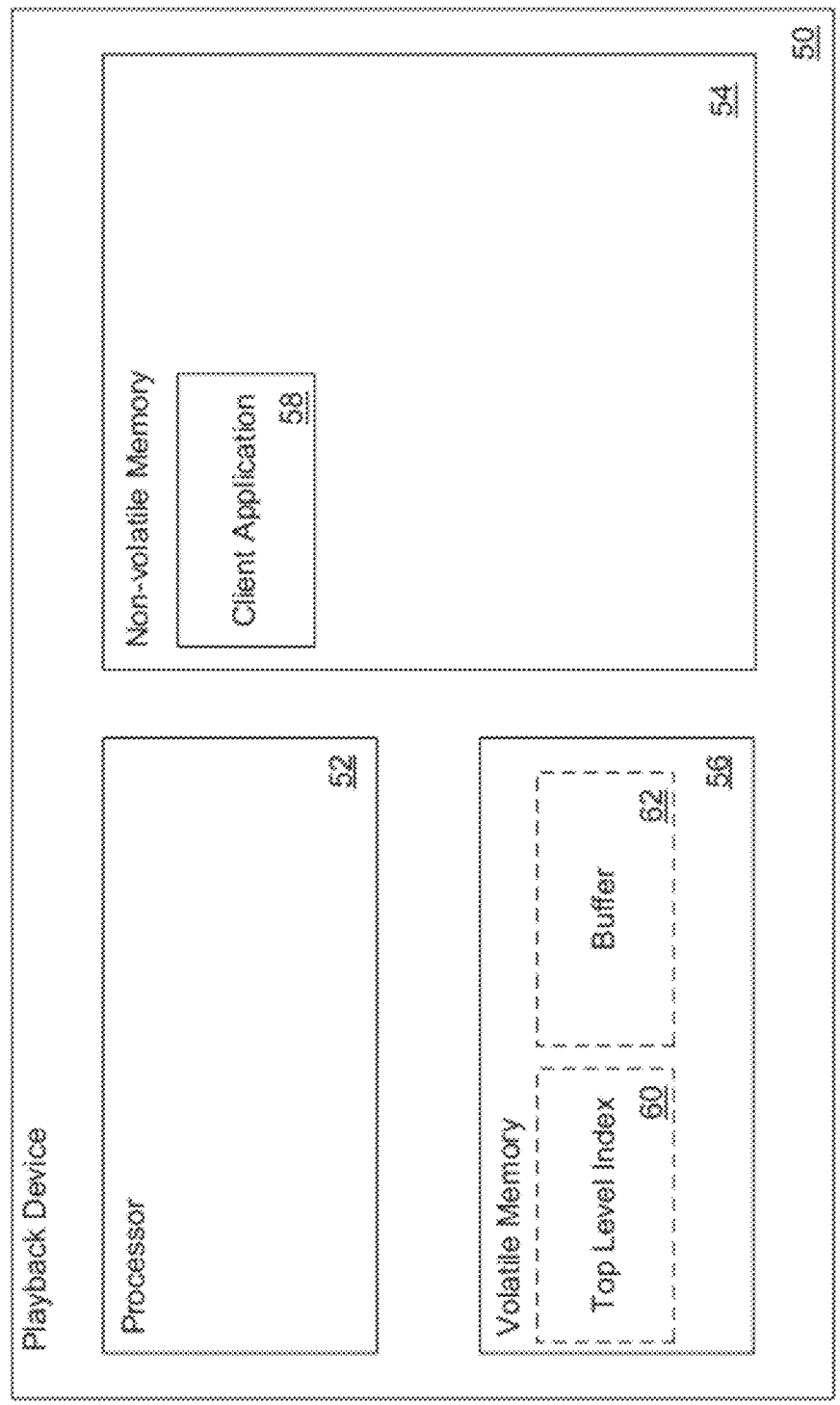
FIG. 1C is an architecture diagram of a playback device in accordance with an embodiment of the invention.

In the system illustrated in FIG. 1A, the playback devices are personal computers, and mobile phones. In other embodiments, playback devices can include consumer electronics devices such as DVD players, Blu-ray players, televisions, set top boxes, video game consoles, tablets, and other devices that are capable of connecting to a server and playing back encoded media. A basic architecture for a playback device in accordance with an embodiment of the invention is illustrated in FIG. 1C. The playback device 50 includes a processor 52 in communication with non-volatile memory 54 and volatile memory 56. In the illustrated embodiment, the non-volatile memory includes a client application 58 that configures the processor and the playback device to stream content from a remote server.

During operation, the client application 58 can configure the playback device to purchase content from a content store and request a top level index file 60 from a content server or another server. When the top level index file 60 is received from the content server, the client application 58 configures the playback device to store the top level index file 60 in memory 56. The client application 58 can then configure the playback device 50 to playback content by using the top level index file to request portions of container files containing content from a content server. The specific container files selected by the client application 58 can be determined based upon the information available to the client application within the top level index file 60. The requested portions of the container files containing content are stored within a buffer 62 in the memory 56 of the playback device. The size of the buffer typically depends upon the video buffer verifier specified for a particular stream in the top level index file 60. Although in many embodiments, the buffer size is fixed or determined based on any number of factors appropriate to a specific application and/or stream(s). The client application can continue to request and playback content from different container files depending upon the prevailing streaming conditions until a user instruction suspending playback is received or until playback completes.

When the network data rate drops, the playback device can determine an appropriate lower bitrate stream based upon the amount of data that can be downloaded from the lower bitrate stream during the time it will take for the client application to playback the content stored within the buffer 62 and the available data rate. Buffer underflow will not occur following the stream switch provided a sufficient amount of data is downloaded. In several embodiments, the client application 58 responds to a sudden drop in channel rate by selecting the highest bitrate stream for which the lower bound seek delay can be buffered within the playback duration of the currently buffered media at the new channel rate. When the playback device has already buffered an amount of video with a playback duration equal to the upper bound seek delay of the stream being played back and the alternative video streams are encoded in the manner outlined above, the playback device can respond to a drop in network data rate by simply selecting the stream that has the highest maximum bitrate less than the new network data rate. In many embodiments, safety margins are also utilized in the calculations to accommodate variations that occur in real world systems. In several embodiments, additional margins are provided to enable the playback device to grow the amount of buffered data to correspond to the upper bound seek delay of the stream. The manner in which playback devices make stream switching decisions in accordance with embodiments of the invention is discussed further below.

Although a specific playback device architecture is illustrated in FIG. 1C, any of a variety of architectures including architectures where the client application is located on disk or some other form of storage and is loaded into volatile memory at runtime can be utilized to implement playback devices for use in adaptive bitrate streaming systems in accordance with embodiments of the invention.

Measuring Channel Data Rate

Transmission of data from a content server to a playback device can be considered to involve a constant rate channel that varies due to external conditions. Playback devices in accordance with embodiments of the invention measure the rate of the channel and then start streaming the encoded stream that has a maximum bitrate closest to and less than the measured rate of the channel (less any safety margin). In a number of embodiments, the playback device measures the rate of the channel by requesting data and measuring the time taken to receive the requested data from the server.

Due to the fact that the buffer of playback device is sometimes full and therefore cannot accept data or requests byte ranges or chunks of data from container files located on the content server, intervals or gaps can occur in which the playback device does not receive any data. In addition, the playback device can simultaneously stream content from multiple streams. For example, a playback device can simultaneously request content from audio, video and subtitle streams. In many embodiments, playback devices record the size, start time and duration of each downloaded chunk from each stream. These records can be utilized to refine bandwidth measurements by determining overlapping chunks that were received during a time interval and any gaps during which no data was received during the time interval. In this way, a playback device in accordance with embodiments of the invention can determine the channel data rate as the sum of the data downloaded during a predetermined time interval divided by the effective interval, which is determined by subtracting the duration of any gaps from the predetermined time interval. In many instances, the chunks requested by a playback device correspond to a closed group of pictures. In several embodiments, source video is encoded into a plurality of alternative streams and each portion of the source video is encoded as a closed group of pictures in each of the alternative streams. By aligning the intra-coded frames in the alternative streams in this way, the playback device can switch between alternative streams at the completion of the playback of a closed group of pictures. Irrespective of the stream selected at the completion of the playback of a closed group of pictures, the next frame of video in the selected stream is an intra-coded frame.

Figure 2:
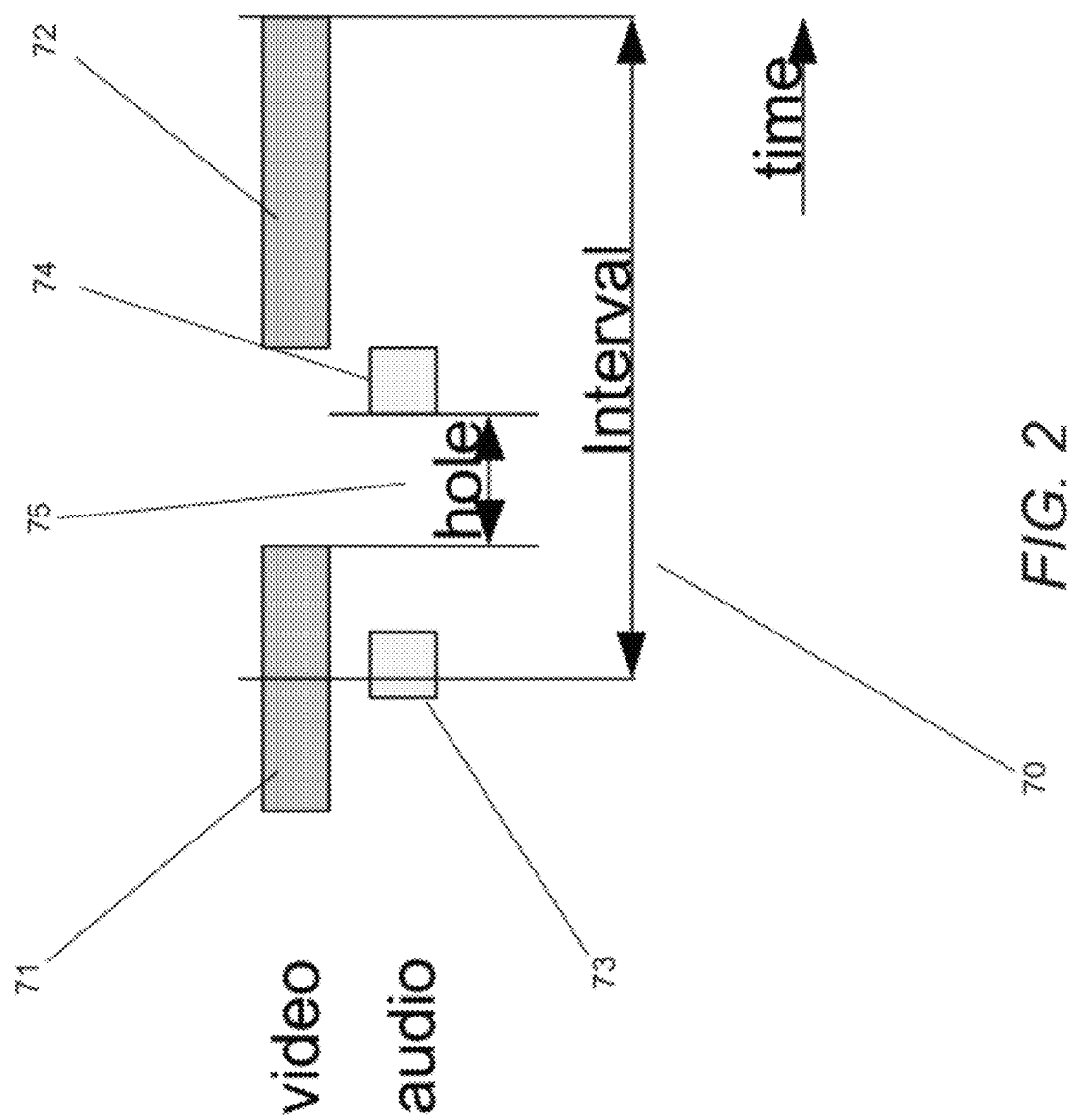
FIG. 2 conceptually illustrates a process for measuring channel data rate in accordance with an embodiment of the invention.

A process utilized to measure channel data rate in accordance with an embodiment of the invention is conceptually illustrated in FIG. 2. In the illustrated embodiment, a predetermined time interval is specified 70 during which data is downloaded from two video chunks 71, 72 and two audio chunks 73, 74. During the predetermined time interval, a gap 75 or hole occurs during which data is not received by the playback device. The channel data rate is calculated as the sum of the bytes of data downloaded during the predetermined time interval 70 from the video chunks 71, 72 and the audio chunks 73, 74 divided by the result of subtracted the duration of the gap 75 from the predetermined time interval. Although a specific process for calculating network data rate is described above, any of a variety of processes appropriate to a specific application can be utilized to determine network data rate in accordance with embodiments of the invention.

Adapting to Changes in Streaming Conditions

As the data rate of a channel changes, the playback device can adapt by selecting the stream that is optimally encoded for the new channel conditions. In several embodiments, each encoded stream is encoded using variable bitrate encoding techniques and the playback devices utilize buffers to smooth the variations in the encoding bitrate. The buffering of media to smooth variations in the encoded bitrate can influence a playback device's decision to switch between streams. When a playback device buffers a sufficiently large amount of data, the playback device has sufficient time to switch between streams and the playback device can choose the highest bitrate stream that has a maximum bitrate, which is less than the new channel rate. When the amount of buffered video has a playback duration that is less than the time required to download a portion of video having a playback duration equal to the upper bound seek delay from a stream having the highest maximum bitrate less than the network data rate, the playback device may select a stream having a lower maximum bitrate to prevent buffer under-flow following the stream switch.

Reducing the amount of data that is initially buffered prior to playback can increase the speed with which playback commences. Buffering less media, however can result in a playback device having less time to switch between streams in the event that the channel rate suddenly decreases. Therefore, a playback device may be forced to select a stream having a bitrate that is lower than would otherwise be the case to avoid underflow. Playback devices in accordance with embodiments of the invention can use either approach or a combination of both approaches. The manner in which playback devices in accordance with embodiments of the invention determine the amount of data to buffer and how to switch streams in response to a sudden decrease in channel rate is discussed further below.

Buffering Variable Bit Rate Streams

The buffering of variable bitrate encoded media prior to the commencement of playback introduces what can be referred to as a buffering or seek delay. The delay is typically equal to the time taken to download a sufficient amount of media that the buffer does not underflow, once playback commences. Assuming channel rate does not change, a playback device should experience uninterrupted playback following the initial seek delay.

Buffering and Playback Using Upper Bound Seek Delay

In many embodiments, each stream is encoded with a maximum bitrate and a maximum buffer size. Therefore, the seek delay for a stream can be determined as the maximum buffer size of the stream divided by the maximum bitrate of the stream. Calculating the seek delay based upon the maximum bitrate of the stream, represents an upper bound on the amount of buffering required to commence playback and can be referred to as the upper bound seek delay. A playback device can safely commence playback of a stream having a maximum bitrate that is less than the channel rate when the playback device has downloaded a portion of media having a duration equal to the upper bound seek delay or a portion of media equal in size to the maximum buffer size attribute of the stream. After playback commences, on average a portion of media corresponding to the duration of the upper bound seek delay remains in the buffer as a result of the encoding of the stream and the rate of the channel.

When the rate of the channel decreases significantly, a playback device in accordance with an embodiment of the invention can switch to a lower bitrate stream (i.e. a stream having a lower maximum bitrate). If the playback device does not buffer a portion of media having a playback duration equal to the upper bound seek delay of the lower bitrate stream prior to completing playback of the previously buffered media, then the playback of the lower bitrate stream may stall. Given that the playback device has buffered a portion of media having a playback duration equal to or greater than the upper bound seek delay, underflow can be avoided if the upper bound seek time of the lower bitrate stream is equal to or less than the upper bound seek delay of the higher bitrate stream. Accordingly, if every stream is encoded to have an upper bound seek delay that is equal to or less than the upper bound seek delay of higher bitrate streams, then the playback device can smoothly transition between streams that are optimal for given channel conditions without regard to seek delay.

Switching Between Streams

Figure 4:
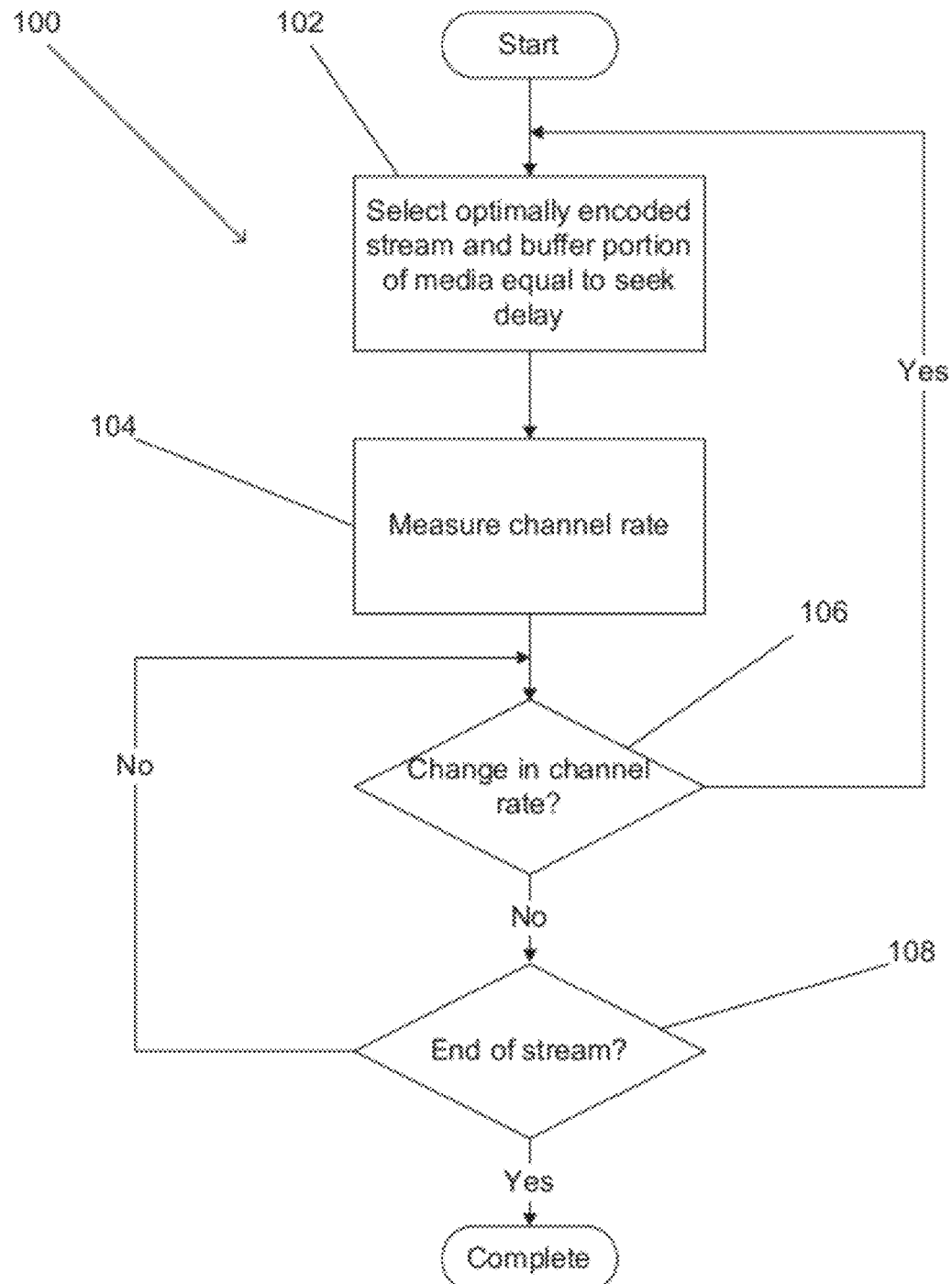
FIG. 4 is a flow chart illustrating a process for switching between streams when the amount of media buffered before commencement of playback is determined using the upper bound seek delay in accordance with an embodiment of the invention.

A process for switching between streams when the amount of media buffered before commencement of playback is determined using the upper bound seek delay is illustrated in FIG. 4. The process 100 includes selecting (102) the optimal stream for the playback conditions and buffering a portion of media having a playback duration equal to the upper bound seek delay prior to playback. Prior to commencement of playback the channel conditions may be unknown, and playback commences at the lowest bitrate (although many embodiments measure the channel rate prior to commencing playback and can utilize bitrate streams having higher maximum bitrates). The playback device then measures (104) the channel data rate and determines (106) whether there has been a change in channel rate. If there has been a change, the playback device chooses (102) the stream that is optimally encoded for the new channel rate. The process repeats until the end of the stream (108) is reached. As can readily be appreciated, the process illustrated in FIG. 4 is extremely simple. The playback device can disregard seek delay due to the encoding of the streams ensuring that lower bit rate streams have an upper bound seek delay equal to or less than the upper bound seek delay of the higher bitrate streams, and due to the playback device buffering a portion of media having a playback duration equal to the upper bound seek delay of the stream. Although a specific process is illustrated in FIG. 4, similar processes appropriate to specific applications can also be utilized in accordance with embodiments of the invention including (but not limited to) processes that utilize lower bounds on seek delay to reduce the time taken to commence playback.

Buffering and Playback Using Lower Bound Seek Delay

When video is encoded at a variable bit rate, all pictures do not have the same size. Depending upon the channel rate, a large frame (e.g. an I-frame) can take more than one frame period to download. Therefore, the clustering of large frames determines the actual minimum seek delay for avoiding stalls in the playback of the video stream at a given channel rate. There is an advantage in knowing the minimum or lower bound seek delay to reduce the time taken to commence streaming and to make stream switching decisions when the amount of data in the buffer is less than the upper bound seek delay. When the amount of data in the buffer is less than the upper bound seek delay and the need to switch streams arises, ideally a stream is selected that has a lower bound seek delay that is smaller than the amount of time it will take to playback the video stored within the buffer. Due to the fact that video data is typically requested in chunks, the lower bound seek delay can be determined based upon the size of the chunks as follows:

$$\text{Delay} = \max \sqrt{\text{chunks}} \left( \frac{\sum_{i=0}^{n} \text{size chunk}_i}{\text{rate}} - (n-1) \cdot \text{duration chunk} \right) \quad [1]$$

Effectively, the lower bound seek delay is determined as the maximum of the difference for each chunk in the time between the chunk arriving (i.e. the sum of size of all preceding chunks and the current chunk n divided by the channel rate) and when it should have arrived to prevent underflow (i.e. (n−1)* playback duration of each chunk) The upper bound seek delay is determined based upon the maximum buffer size of stream of data as follows:

$$\text{Delay} = \frac{\text{level buffersize} + \text{level rate} \cdot \text{duration chunk}}{\text{rate}} \quad [2]$$

The upper bound seek delay is determined to be the time it takes to download the largest possible chunk plus the time taken to playback the chunk. Due to the manner in which variable bit rate video is encoded, the largest possible frame in the stream can theoretically be as large as the buffer size.

Using either equation, a minimum buffer delay for a stream can be determined. While the lower bound seek delay is typically less than the upper bound seek delay, the lower bound seek delay also changes depending upon the point at which playback commences. The lower bound seek delay for each point in each stream can be calculated in advance by a server and provided to the playback device as required. Alternatively, many H.264 bitstreams carry delay information in the SEI buffering message in the field initial_cpb_removal_delay. While this value is not the same as performing the above calculation, it has been found to be equivalent and, in several embodiments, the initial_cpb_removal_delay value at a particular point in the stream is used as the lower bound seek delay at that point.

Playback can typically commence sooner when a playback device uses the lower bound seek delay to determine the amount of buffered media that can prevent underflows. During playback, however, the playback device may have less buffered content than when the upper bound seek delay is used. Therefore, when the channel rate decreases, the playback device has less time to switch to a lower bitrate stream. In many embodiments, the playback device selects a stream having a maximum bitrate that is less than and closest to the new channel rate, and from which a portion of media having a playback duration equal to the lower bound seek delay can be downloaded in the time it will take to playback the remaining buffered media. In many instances, the stream that is optimally encoded for the channel conditions is not the stream selected, because insufficient media can be downloaded in the time it will take to playback the buffered content. Instead, a lower bitrate stream may be selected so that the portion of media downloaded during the playback of the buffered media has a playback duration equal to or greater than the lower bound seek delay for the lower bitrate stream. When a sufficient portion of media has accumulated in the playback device's buffer, the playback device can switch to a higher rate bitstream that is optimal for the channel bitrate.

A playback device utilizing lower bound seek delays when switching between streams in accordance with an embodiment of the invention can obtain the lower bound seek delay for each of the streams from the server. In several embodiments, the lower bound seek delays are encoded in the stream received from the server. In a number of embodiments, the playback device separately obtains the lower bound seek delays from the server. In several embodiments, the playback device utilizes the highest of the lower bound seek delays for each of the streams as the lower bound seek delay for all of the streams. The highest of the lower bound seek delays can be referred to as the safe seek delay, because it is safe for the playback device to use with respect to all of the streams. Utilizing the safe seek delay instead of the lower bound seek delays for each stream can be desirable as knowing the safe seek delay of the current stream gives sufficient knowledge over the seek delay of all other alternative streams. In many embodiments, the maximum initial_cpb_removal_delay value across all corresponding locations in the streams is considered to be the safe seek delay and is inserted in the initial_cpb_removal_delay field in the SEI buffering message of each stream. In other embodiments, any of a variety of techniques is utilized to provide the playback device with the delay associated with each of the streams in advance of the playback device selecting a new stream in response to a change in channel rate.

Buffering and Playback Using a Combination of Lower and Upper Bound Seek Delay

Utilizing lower bound seek times enables playback to commence more rapidly. Using upper bound seek times in combination with appropriately encoded content simplifies switching between streams. In a number of embodiments, playback devices utilize processes that harness the benefits of both approaches.

Figure 5:
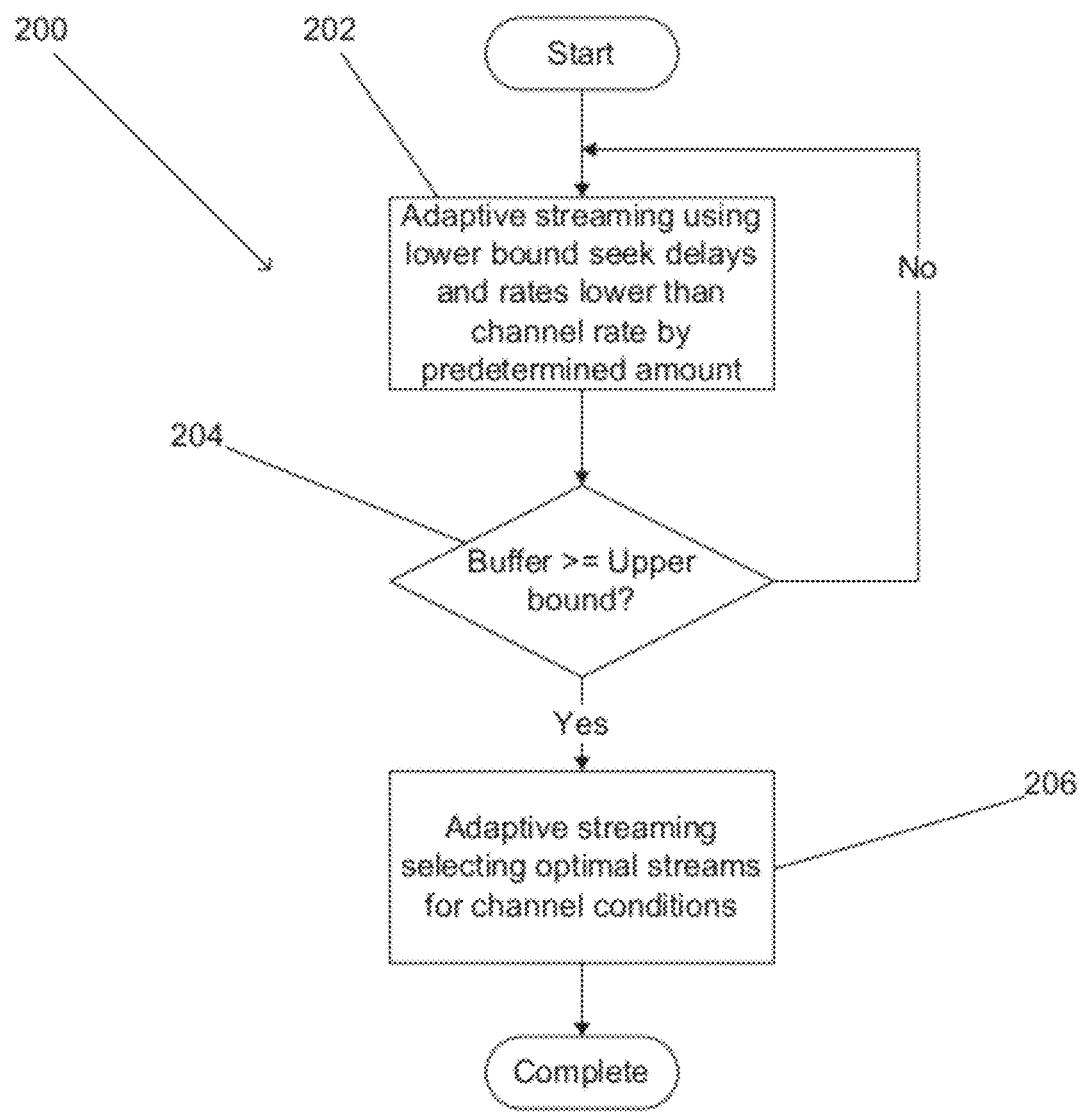
FIG. 5 illustrates a process for performing adaptive bitrate streaming in accordance with an embodiment of the invention.

A process for performing adaptive bitrate streaming in accordance with an embodiment of the invention is illustrated in FIG. 5. The process 200 assumes that the streams are encoded in a similar manner to the streams described above with respect to the process shown in FIG. 4 and that lower bound seek delay or safe seek delay information is available to the playback device (e.g. within each stream). The process 200 commences in a similar manner to the adaptive bitrate streaming process described above that utilizes a lower bound seek delay or a safe seek delay to determine when to commence playback. The adaptive bitrate process differs with respect to the process described above, however, in that the rates of the streams selected during the initial adaptive bitrate process (202) are a predetermined amount less than the channel rate. Lower bitrate streams are selected so that media accumulates in the playback device's buffer. In a number of embodiments, a stream is selected having a bitrate that is 33% less than the channel rate. Although in other embodiments the predetermined amount can be greater, less, and/or determined in other ways that result in the accumulation of media in the buffer of the playback device during media playback. When the amount of media accumulated in the buffer is determined (204) to have a playback duration greater than or equal to the upper bound seek delay of the stream and/or a size greater than or equal to the maximum buffer size for the encoded stream, the adaptive bitrate streaming process transitions (206) to the adaptive bitrate streaming process illustrated in FIG. 4 in which the combination of the encoding of the streams and the amount of media stored in the playback device's buffer enables the playback device to select the optimally encoded stream for a given channel rate without regard to seek delay.

Although a specific process is illustrated in FIG. 5 and specific stream switching rules are discussed above combining the benefits of lower bound seek times to achieve rapid playback and the simplicity of upper bound seek times when switching streams, a number of processes can utilize varying buffering requirements during adaptive bitrate streaming to achieve different performance objectives in accordance with embodiments of the invention.

Stream Switching when Using a Combination of Lower and Upper Bound Seek Delay

When a playback device can utilize both lower and upper bound seek delays, sets of stream switching rules are utilized that are dependent upon the amount of buffered video. As discussed above with respect to FIG. 5, a playback device can utilize lower bound seek delays to reduce the time spent buffering prior to commencing playback of video. During this initial start up period, a stream switching rule can be applied that involves selecting a stream where the lower bound seek delay of the stream is less than the amount of time it will take to playback the video buffered at the time of the stream switch. Such a rule can be expressed as follows:

1. If (buffer level<upper bound seek delay) then select a stream having a lower bound seek delay that is less than the playback duration of the buffered video.

In the event that a network bandwidth measurement cannot be reliably made, a playback device can utilize an additional streaming rule that forces the selection of the lowest bitrate stream. This stream switching rule can be expressed as follows:

2. If (buffer level<upper bound seek delay and network data rate is unreliable or inaccurate) then select the lowest bitrate stream.

When a steady network data rate is experienced for a long enough period of time or a lower bitrate stream is selected to grow the buffer in the manner described above with respect to FIG. 5, then the amount of video buffered by the playback device will climb to the point where it exceeds the upper bound seek delay of the stream. At which point, stream switching can be performed based upon the measured network bandwidth and the maximum bitrate of the streams. Where the upper bound seek delay of streams encoded at a lower maximum bitrate are known, a similar stream switching decision could be made based upon the upper bound seek delay of the stream to which the switch is being made. The corresponding stream switching rule can be expressed as follows:

3. If (network data rate is reliable and upper bound seek delay<=buffered video), then select the stream having a maximum bitrate that is the highest of the alternative streams that have a maximum bitrate less than the network data rate.

When the playback device is downloading chunks of a stream much faster than expected according to the level rate, then the channel data rate is much higher than the maximum bitrate of the stream and it is difficult to reliably measure the network data rate so a higher bitrate stream can be selected once the amount of video buffered exceeds the upper bound seek delay. This stream switching rule can be expressed as follows:

4. If (expected time to download chunk>>actual time taken to download chunk and upper bound seek delay<=buffered video), then select the stream having the next highest maximum bitrate.

In addition to the above rules, playback devices in accordance with embodiments of the invention can incorporate hysteresis in the stream switching rules to prevent excessive switching of levels when the measured network data rate oscillates around a decision threshold. Furthermore, a playback device may include safety margins or headroom between the measured network data rate and the maximum bitrate of a selected stream when selecting streams. In many embodiments, the headroom can be temporarily increased after a significant bandwidth drop (e.g. a predetermined amount or percentage) to reduce the likelihood of buffer underflow in the event of an additional drop in network data rate. Also, the playback device can throttle the downloading of other media (particularly at start up) to reduce the time taken for the playback duration of the buffered video data for a particular stream to match or exceed the upper bound seek delay.

Although specific stream switching rules are discussed above combining the benefits of lower bound seek times to achieve rapid playback and the simplicity of upper bound seek times when switching streams, any of a variety and combination of stream switching rules can be utilized during adaptive bitrate streaming to achieve different performance objectives in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A playback device configured to perform adaptive bitrate streaming of media including a set of alternative video streams, the playback device comprising:
   memory including a client application and a buffer; and
   a processor, where the client application configures the processor to:
      select a first video stream from a set of alternative video streams provided by a content server, where each stream in the set of alternative video streams is encoded to have an a different maximum bit rate and upper bound seek delay that is equal to or less than the upper bound seek delay of other streams in the set of alternative video streams that are encoded at a higher maximum bitrate;

request chunks of the first video stream from the content server via a network connection;

receive the chunks from the content server via the network connection;

store the requested chunks in the buffer;

playback the buffered chunks of the first video stream;

measure the channel data rate of the network connection; and select a second video stream from the set of alternative streams, where the second video stream has a maximum bitrate that is less than the measured channel data rate, where the selected second stream has an upper bound seek delay that is less than the streams in the set of alternative streams that are encoded at a higher bit rate.

2. The playback device of claim 1, wherein the client application configures the processor to measure the channel data rate of the network connection by configuring the processor to:

calculate the amount of data downloaded during a predetermined time interval;

observe a duration of any gaps during which no data is downloaded during the predetermined time interval;

calculate an effective time interval by subtracting the duration of any gaps from the predetermined time interval; and divide the amount of data downloaded by the effective time interval to obtain a data rate measurement.

3. The playback device of claim 2, wherein the client application further configures the processor to obtain a measured channel data rate by subtracting a predetermined safety margin from the data rate measurement.

4. The playback device of claim 1, wherein the client application configures the processor to determine a playback duration for the chunks from the first stream stored in the buffer and select a second video stream having the highest maximum bitrate that is less than the measured channel data rate in response to the buffer containing chunks from the first video stream having a playback duration greater than or equal to the upper bound seek delay of the first video stream.

5. The playback device of claim 1, wherein the client application configures the processor to determine a playback duration for the chunks from the first stream stored in the buffer and select a second video stream having the highest maximum bitrate that is less than the measured channel data rate in response to the buffer containing chunks from the first video stream having a playback duration greater than or equal to the upper bound seek delay of the second video stream.

6. The playback device of claim 5, wherein:

each stream in the set of the alternative streams of video is encoded subject to a maximum buffer size constraint and a maximum bitrate; and the client application configures the processor to determine the upper bound seek delay of a stream of video based upon the maximum buffer size constraint and a maximum bitrate used in the encoding of the video stream.

7. The playback device of claim 6, wherein the client application configures the processor to determine the upper bound seek delay of a stream of video as:

$$\text{Delay} = \frac{\text{level buffersize} + \text{level rate} \cdot \text{duration chunk}}{\text{rate}}$$

where level buffersize is the maximum buffer size constraint used in encoding the video stream;

duration chunk is the time taken to playback a single chunk of video;

level rate is the maximum bitrate of the video; and rate is the network data rate.

8. The playback device of claim 1, wherein the client application configures the processor to select a second video stream from the set of alternative streams so that the playback duration of the amount of media downloaded from the second video stream during the time taken to playback buffered chunks of content from the first video stream is greater than or equal to the lower bound seek delay of the second video stream.

9. The playback device of claim 8, wherein:

the lower bound seek delay of each of the alternative video streams is included in each of the alternative video streams; and the client application further configures the processor to obtain the lower bound seek delay of the second video stream from the first video stream.

10. The playback device of claim 1, wherein:

the set of alternative streams of video are H.264 bitstreams that carry delay information in a SEI buffering message in a initial_cpb_removal_delay field; and the client application configures the processor to select a second video stream from the set of alternative streams so that the playback duration of the amount of media downloaded from the second video stream during the time taken to playback buffered chunks of content from the first video stream is greater than or equal to a delay calculated using the value specified in the of the SEI buffering message in an initial_cpb_removal_delay field in the second stream.

11. The playback device of claim 1, wherein:

a safe seek delay is included in each of the alternative video streams; and the client application configures the processor to select a second video stream from the set of alternative streams so that the playback duration of the amount of media downloaded from the second video stream during the time taken to playback buffered chunks of content from the first video stream is greater than or equal to the safe seek delay.

12. The playback device of claim 11, wherein the streams in the set of alternative streams of video are H.264 bitstreams that carry the safe seek delay in a SEI buffering message in a initial_cpb_removal_delay field.

13. The playback device of claim 1, wherein the client application configures the processor to:

select the first video stream from the set of alternative streams so that the first video stream has a maximum bitrate that is a predetermined amount below the measured channel data rate; and buffer chunks received from the first video stream during playback of the first video stream so that the playback duration of the buffered chunks is greater than or equal to the upper bound seek delay for the first video stream.

14. The playback device of claim 13, wherein the client application configures the processor to select a second video stream having the highest maximum bitrate that is less than the measured channel data rate when the buffer contains chunks from the first video stream having a playback duration greater than or equal to the upper bound seek delay of the first video stream.

15. The playback device of claim 1, wherein the client application configures the processor to select a second video stream having the lowest maximum bitrate when the buffer contains chunks from the first video stream having a playback duration less than the upper bound seek delay of the first video stream and the measured channel data rate is unreliable.

16. The playback device of claim 1, wherein the client application configures the processor to select a second video stream having a maximum bitrate that is greater than the maximum bitrate of the first video stream when the expected time to download a chunk of the first video stream based upon the measured channel data rate is a predetermined amount greater than the actual time taken to download the chunk of the first video stream and the buffer contains chunks from the first video stream having a playback duration greater than or equal to the upper bound seek delay of the first video stream.

17. A method of perform adaptive bitrate streaming of media including a set of alternative video streams, the method comprising:
    selecting a first video stream from a set of alternative video streams provided by a content server using a playback device, where each of the streams in the set of alternative video streams is encoded to have a different maximum bitrate and an upper bound seek delay that is equal to or less than the upper bound seek delay of the streams in the set of alternative video streams that are encoded at a higher maximum bitrate;
    requesting chunks of the first video stream from the content server via a network connection using the playback device;
    receiving the chunks of the first video steam from the content server via the network connection;
    storing the requested chunks in a buffer of the playback device;
    playing back the buffered chunks of the first video stream using the playback device;
    measuring the channel data rate of the network connection using the playback device; and
    selecting a second video stream from the set of alternative streams using the playback device, where the second video stream has a maximum bitrate that is less than the measured channel data rate and an upper bound seek delay that is equal to or less than the upper bound seek delay of the streams in the set of alternative video streams that are encoded at a higher maximum bitrate.

18. The method of claim 17, wherein measuring the channel data rate of the network connection using the playback device further comprises:
    calculating the amount of data downloaded during a predetermined time interval using the playback device;
    observing a duration of any gaps during which no data is downloaded during the predetermined time interval using the playback device;
    calculating an effective time interval by subtracting the duration of any gaps from the predetermined time interval using the playback device; and
    dividing the amount of data downloaded by the effective time interval to obtain a data rate measurement using the playback device.

19. The method of claim 18, wherein measuring the channel data rate of the network connection using the playback device further comprises obtaining a measured channel data rate by subtracting a predetermined safety margin from the data rate measurement.

20. The method of claim 17, wherein selecting a second video stream from the set of alternative streams using the playback device further comprises determining a playback duration of the chunks contained in the buffer and selecting a second video stream using the playback device, where the second stream has the highest maximum bitrate that is less than the measured channel data rate in response to the buffer containing chunks from the first video stream having a playback duration greater than or equal to the upper bound seek delay of the first video stream.

21. The method of claim 17, wherein selecting a second video stream from the set of alternative streams using the playback device further comprises determining a playback duration of the chunks contained in the buffer and selecting a second video stream using the playback device, where the second stream has the highest maximum bitrate that is less than the measured channel data rate in response to the buffer containing chunks from the first video stream having a playback duration greater than or equal to the upper bound seek delay of the second video stream.

22. The method of claim 21, wherein each steam in the set of alternative streams of video is encoded subject to a maximum buffer size constraint and the method further comprises determining the upper bound seek delay of a stream of video using the playback device based upon the maximum buffer size constraint used in the encoding of the video stream.

23. The method of claim 22, further comprising determining the upper bound seek delay of a stream of video as:

$$\text{Delay} = \frac{\text{level buffersize} + \text{level rate} \cdot \text{duration chunk}}{\text{rate}}$$

where level buffersize is the maximum buffer size constraint used in encoding the video stream;
        duration chunk is the time taken to playback a single chunk of video;
        level rate is the maximum bitrate of the video; and
        rate is the network data rate.

24. The method of claim 17, wherein selecting a second video stream from the set of alternative streams using the playback device further comprises selecting a second video stream from the set of alternative streams using the playback device so that the playback duration of the amount of media downloaded from the second video stream during the time taken to playback buffered chunks of content from the first video stream is greater than or equal to the lower bound seek delay of the second video stream.

25. The method of claim 24, wherein the lower bound seek delay of each stream in the set of alternative video streams is included in each of the alternative video streams and the method further comprises obtaining the lower bound seek delay of the second video stream from the first video stream using the playback device.

26. The method of claim 17, wherein:
    the streams in the set of alternative streams of video are H.264 bitstreams that carry delay information in a SEI buffering message in a initial_cpb_removal_delay field; and
    selecting a second video stream from the set of alternative streams using the playback device further comprises selecting a second video stream from the set of alternative streams using the playback device so that the playback duration of the amount of media downloaded from the second video stream during the time taken to playback buffered chunks of content from the first video stream is greater than or equal to a delay calculated using the value specified in the of the SEI buffering message in an initial_cpb_removal_delay field in the second stream.

27. The method of claim 17, wherein:
a safe seek delay is included in each of the alternative video streams; and
the selecting of a second video stream from the set of alternative streams using the playback device further comprises selecting a second video stream from the set of alternative streams so that the playback duration of the amount of media downloaded from the second video stream during the time taken to playback buffered chunks of content from the first video stream is greater than or equal to the safe seek delay.

28. The method of claim 27, wherein the streams in the set of alternative streams of video are H.264 bitstreams that carry the safe seek delay in a SEI buffering message in a initial_cpb_removal_delay field.

29. The method of claim 17, wherein selecting a first video stream from the set of alternative streams further comprises:
selecting the first video stream from the set of alternative streams using the playback device so that first video stream has a maximum bitrate that is a predetermined amount below the measured channel data rate; and
buffering chunks of the first video stream during playback of the first video stream so that the playback duration of the amount of the buffered chunks from the first video stream is greater than or equal to the upper bound seek delay for the first video stream.

30. The method of claim 29, wherein selecting a second video stream from the set of alternative streams using the playback device further comprises selecting a second video stream using the playback device, where the second video stream has the highest maximum bitrate that is less than the measured channel data rate when the buffer contains chunks from the first video stream having a playback duration greater than or equal to the upper bound seek delay of the first video stream.

31. The method of claim 30, wherein selecting a second video stream from the set of alternative streams using the playback device further comprises selecting a second video stream using the playback device, where the second video stream has the lowest maximum bitrate when the buffer contains chunks from the first video stream having a playback duration less than the upper bound seek delay of the first video stream and the measured channel data rate is unreliable.

32. The method of claim 17, wherein selecting a second video stream from the set of alternative streams using the playback device further comprises selecting a second video stream using the playback device, where the second video stream has a maximum bitrate that is greater than the maximum bitrate of the first video stream when the expected time to download a chunk of the first video stream based upon the measured channel data rate is a predetermined amount greater than the actual time taken to download the chunk of the first video stream and the buffer contains chunks from the first video stream having a playback duration greater or equal to the upper bound seek delay of the first video stream.

* * * * *